Dec. 29, 1964  P. RENAUT  3,163,784
APPARATUS FOR CONTINUOUS INSPECTION OF SHEETS AND LEAVES
Filed July 31, 1957  2 Sheets-Sheet 1

United States Patent Office 3,163,784
Patented Dec. 29, 1964

3,163,784
APPARATUS FOR CONTINUOUS INSPECTION OF SHEETS AND LEAVES
Paul Renaut, Saint-Maur, France, assignor to Societe Realisations Ultrasoniques, a corporation of France
Filed July 31, 1957, Ser. No. 675,408
Claims priority, application France, Aug. 11, 1956, 9,657, Patent Add. 70,023
2 Claims. (Cl. 310—8.7)

The invention relates to testing and exploration of materials, specifically of sheet or plate-shaped materials in continuous motion, by means of elastic pressure waves, preferably supersonic waves.

An object of the present invention is to provide a new system, operating by transparency or by reflection for checking the quality of a test object, in particular a moving test object, or for measuring its thickness.

According to the invention, the transversal motion of a supersonic beam with respect to the tested object is achieved by rotating a supersonic source located at the focus of a reflector which it illuminates. According to one embodiment, the reflector is a parabolic cylinder. The supersonic beam is reflected on a further reflector, oriented in such a way that the said beam finally reaches the surface of the material to be examined, under a constant incidence angle (preferably normal), and is received after travelling from the source over a constant distance, whatever its initial transmission angle be.

According to a particular embodiment, the supersonic wave is continuously transmitted and frequency modulated, the intensity of the wave, received by the receiver, preferably through the tested sheet, then being maximum for the resonant frequency of the sheet, this frequency depending on the sheet thickness.

The invention will be more clearly understood from the following specification and the appended drawings in which:

FIG. 1 diagrammatically illustrates the path of a supersonic wave beam reflected by a parabolic reflector and directed towards an object to be tested;

Figure 1:
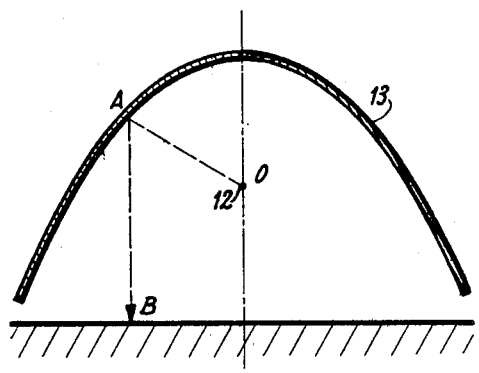

In the diagram of FIG. 1, a source of supersonic waves 12 is located at the focus of a reflector 13 shaped as a parabolic cylinder, a transversal section of which is illustrated. When this source rotates about it axis which is parallel to the reflector surface, the supersonic waves reflected by reflector 13 are all parallel to the axis of the reflector parabolic section. Besides, whatever the direction of radius OA may be, the sum OA+AB is constant (where A is the reflection point of the radius from the reflector and B the point where it reaches the surface 14 of the material to be examined, which is arranged parallel to the reflector generatrix).

Thus during the sheet scanning, the incidence of and the length of the path of the supersonic waves are constant, and therefore the absorption by the transmitting medium is constant, which is an important advantage of systems in accordance with this principle.

Of course, for actually carrying out this principle, either a device applying the reflection method (then the transmitting piezoelectric member 12 may be simultaneously used as a receiver as is well known in the art), or a device using a "transparency" method may be used. In this event a similar device is located on the other side of the material to be examined.

Figure 2:
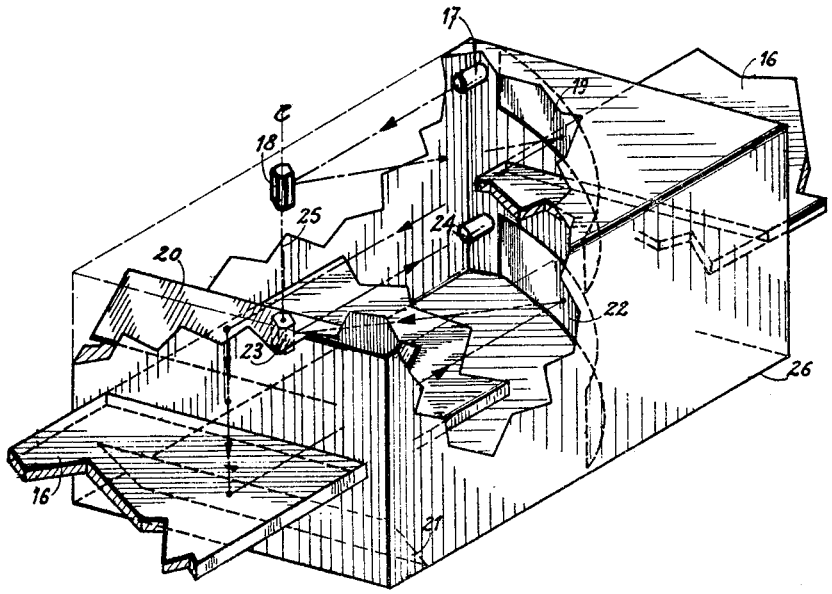
FIG. 2 is a perspective view of a scanning unit according to the invention.
Figure 3:
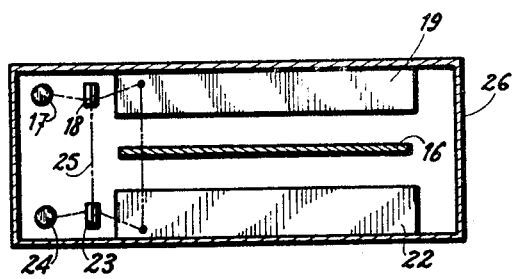
FIG. 3 is a vertical section through the scanning unit of FIG. 1.

A scanning unit operating by transparency built in accordance with these principles is shown in FIGS. 2 and 3. A sheet 16 moves between similar transmitting and receiving devices. The transmitting device includes a supersonic source 17 whose oscillations impinge successively the faces of a rotating prismatic reflector 18 located at the focus of a reflector 19 shaped as a parabolic cylinder and having a regular polygonal base. Ultrasonic waves, after being reflected from reflector 19 travel parallel to the axis 25 of the reflector 18 towards a plane reflector 20 making a 45° angle with the horizontal plane. Then they travel through the sheet 16 perpendicularly to its surface and are received by a receiving device similar to the transmitting device and including a plane reflector 21 inclined 45° with the horizontal plane, a reflector 22 shaped as a parabolic cylinder at the focus of which is located a rotating reflector 23 similar to reflector 18 and mounted on the same shaft as reflector 18, and a piezoelectric transducer 24 connected to amplifying and display device illustrated in FIG. 4. The whole scanning is immersed in a liquid having high conductivity for transmitting supersonic waves; the tank housing the liquid may consist of the system frame, partially omitted in the drawing to let the above described elements appear. The sheet to be examined travels through the frame 26, while watertight joints are provided.

As may be seen from FIG. 2, and as has been indicated hereinabove two similar assemblies respectively situated at the two sides of the sheet 16 to be examined are necessary with a system operating by transparency, only one of these assemblies being necessary with a system operating by reflection.

The display unit may consist of a cathode ray tube 27 the control electrode 28 of which is fed with an electric signal proportional to the strength of signals received by transducer 24. The CRT horizontal sweep, provided by a conventional time-base generator is synchronized with the rotation of reflector 23. The rotation velocity of reflector 23 is high with respect to the velocity of the sheet motion. The synchronizing means is shown symbolically as a dash and dot line 30, FIG. 4.

Figure 4:
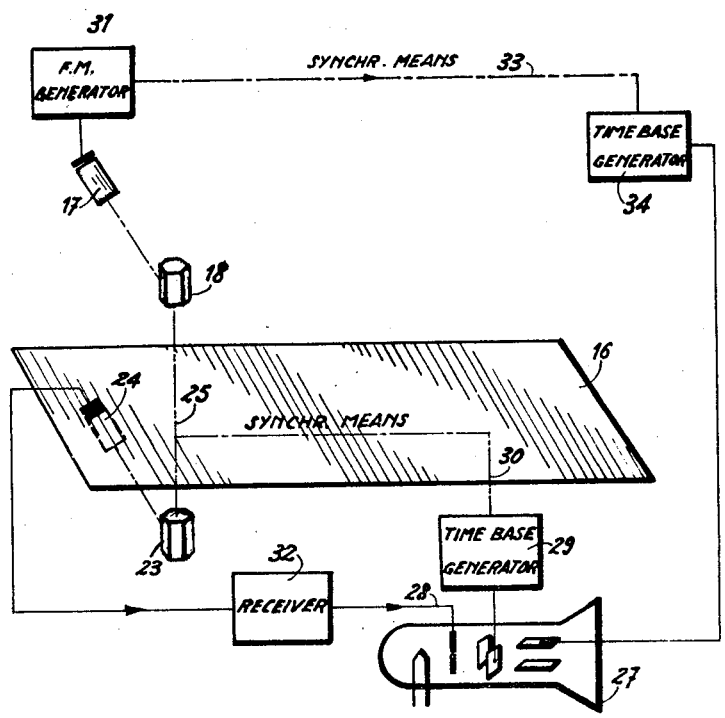
FIG. 4 is a block diagram of a frequency modulation inspection device according to an embodiment of the invention.

In an embodiment of this device illustrated in FIG. 4, a continuous frequency modulated supersonic wave is used. A frequency modulated generator 31 is connected to the source 17 of supersonic waves. A receiver 32 is connected to the receiving element 24 which receives the supersonic waves. When the frequency of this wave is equal to the natural frequency of the sheet, the amplitude of the ultra-sounds transmitted by the sheet is maximum. In this embodiment, the vertical sweep is made at the rate of the frequency modulation. This is obtained by the synchronizing means 33 (shown schematically as a dash and dot line in the drawing) which connects generator 31 to a conventional time-base generator 34, so that, at any moment, the ordinate of the luminous spot on the screen is proportional to the wave instantaneous frequency; then signals corresponding to the resonance appear as bright points arranged as a horizontal straight line when the sheet thickness is constant.

It must be noted that, with this frequency modulation method, it is very important, in order for standing waves to be correctly formed, that the supersonic beam enters the sheet in a direction perpendicular to its surface. This result is achieved at every moment during scanning of the sheet due to the scanning device provided with parabolic reflector according to the invention.

Of course the invention is not limited to the above embodiments described by way of non limiting examples.

Many various modifications may be brought thereto without departing from the spirit of the invention. Particularly the various described devices may be combined.

In the scanning device of FIG. 2 the rotating reflector may be substituted by a rotating directional supersonic source located at the parabolic focus.

Also there could be used, instead of a parabolic reflector a conical reflector may be used the axis of which is perpendicular to the inspected sheet. Of course, in this case the scanning is performed along arcs of a circle, instead of straight lines, but this is not detrimental in many practical cases.

What I claim is:

1. In an apparatus for nondestructive testing of a preselected portion of an object by ultrasonic vibrations, in combination; a parabolic reflector for reflecting ultrasonic vibrations supported over said object; an electromechanical transducer arranged substantially at the focus of and directed toward said parabolic reflector for generating a narrow beam of ultrasonic vibrations which beam of ultrasonic vibrations is reflected by said parabolic reflector, said reflected beam impinging on said object at right angles thereto; and means for imparting rotational movement to said electromechanical transducer whenever desired whereby said beam of penetrating ultrasonic vibrations is reflected by said parabolic reflector and impinges on various portions of said object at right angles thereto.

2. In an apparatus for nondestructive testing of a preselected portion of an object by ultrasonic vibrations, in combination: a parabolic reflector for reflecting ultrasonic vibrations supported over said object; a signal source arranged substantially at the focus of and directed toward said parabolic reflector and adapted for the transmission of a narrow beam of ultrasonic vibrations which beam of ultrasonic vibrations is reflected by said parabolic reflector, said reflected beam impinging on said object at right angles thereto; and means for imparting rotational movement to said source whenever desired whereby said beam of penetrating ultrasonic vibrations is reflected by said parabolic reflector and impinges on various portions of said object at right angles thereto.

References Cited in the file of this patent

UNITED STATES PATENTS

| | | |
|---|---|---|
| 2,378,237 | Morris | June 12, 1945 |
| 2,453,502 | Dimmick | Nov. 9, 1948 |
| 2,593,865 | Erdman | Apr. 22, 1952 |
| 2,618,968 | McConnell | Nov. 25, 1952 |
| 2,700,895 | Carson | Feb. 1, 1955 |
| 2,740,289 | Van Valkenburg et al. | Apr. 3, 1956 |
| 2,921,126 | Street et al. | Jan. 12, 1960 |

FOREIGN PATENTS

| | | |
|---|---|---|
| 112,995 | Australia | Mar. 11, 1948 |
| 696,920 | Great Britain | Sept. 9, 1953 |
| 766,981 | Great Britain | Jan. 30, 1957 |